April 12, 1960         W. T. PATTISON         2,932,332
SCREW-DRIVING MACHINES
Filed Oct. 21, 1957                         6 Sheets-Sheet 3
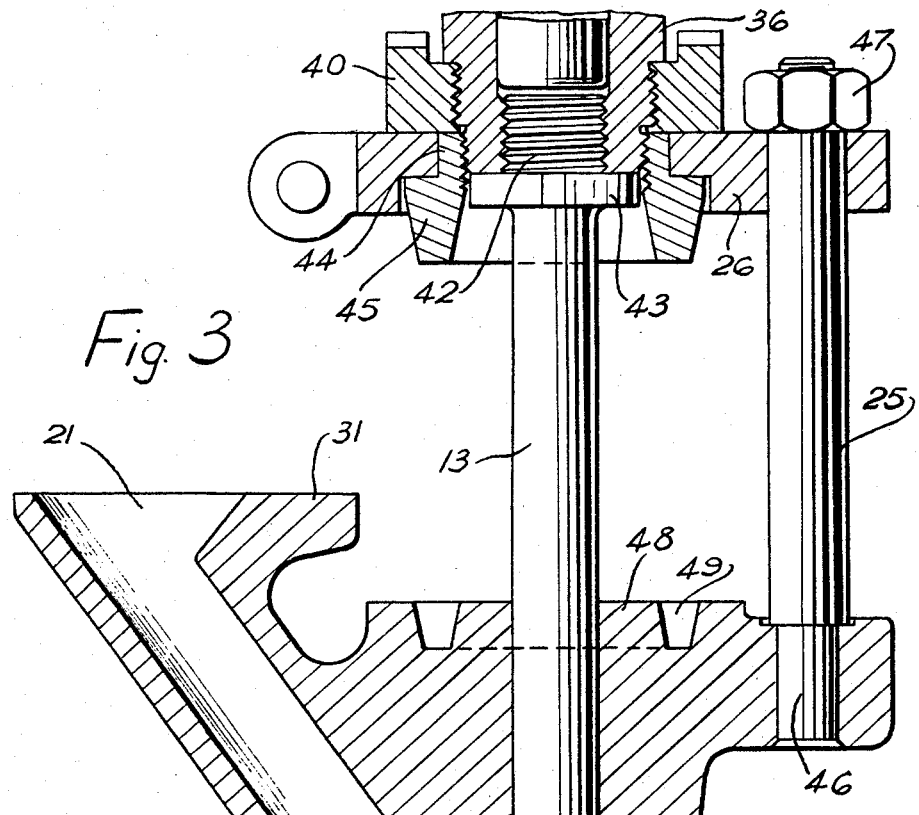
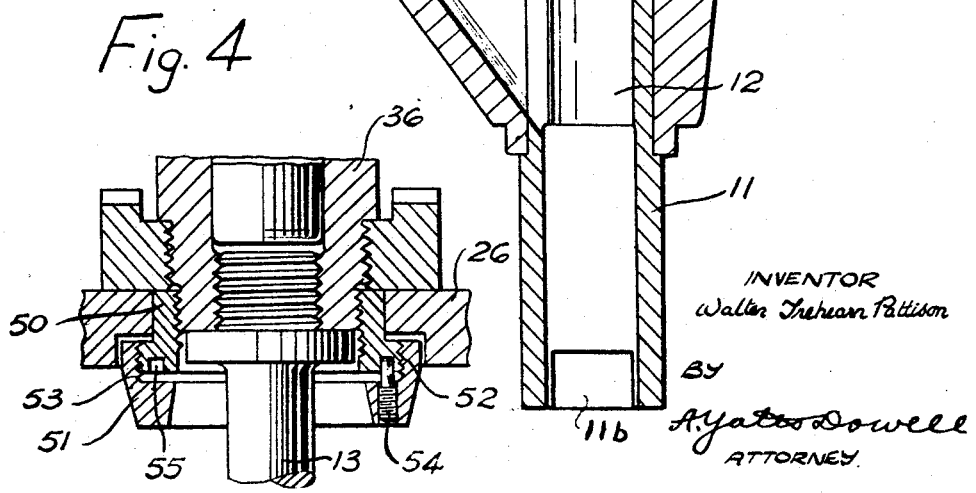
INVENTOR
Walter Trehearn Pattison
BY
A. Yates Dowell
ATTORNEY

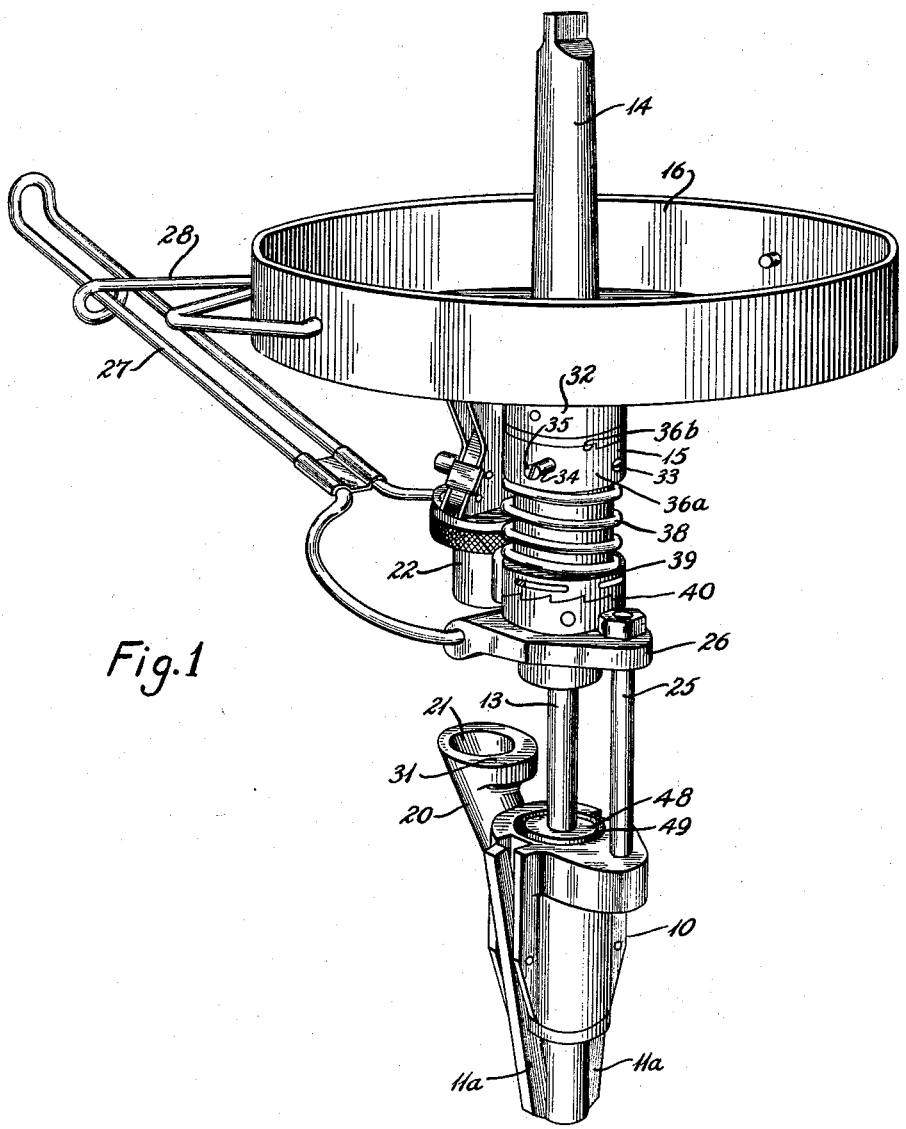

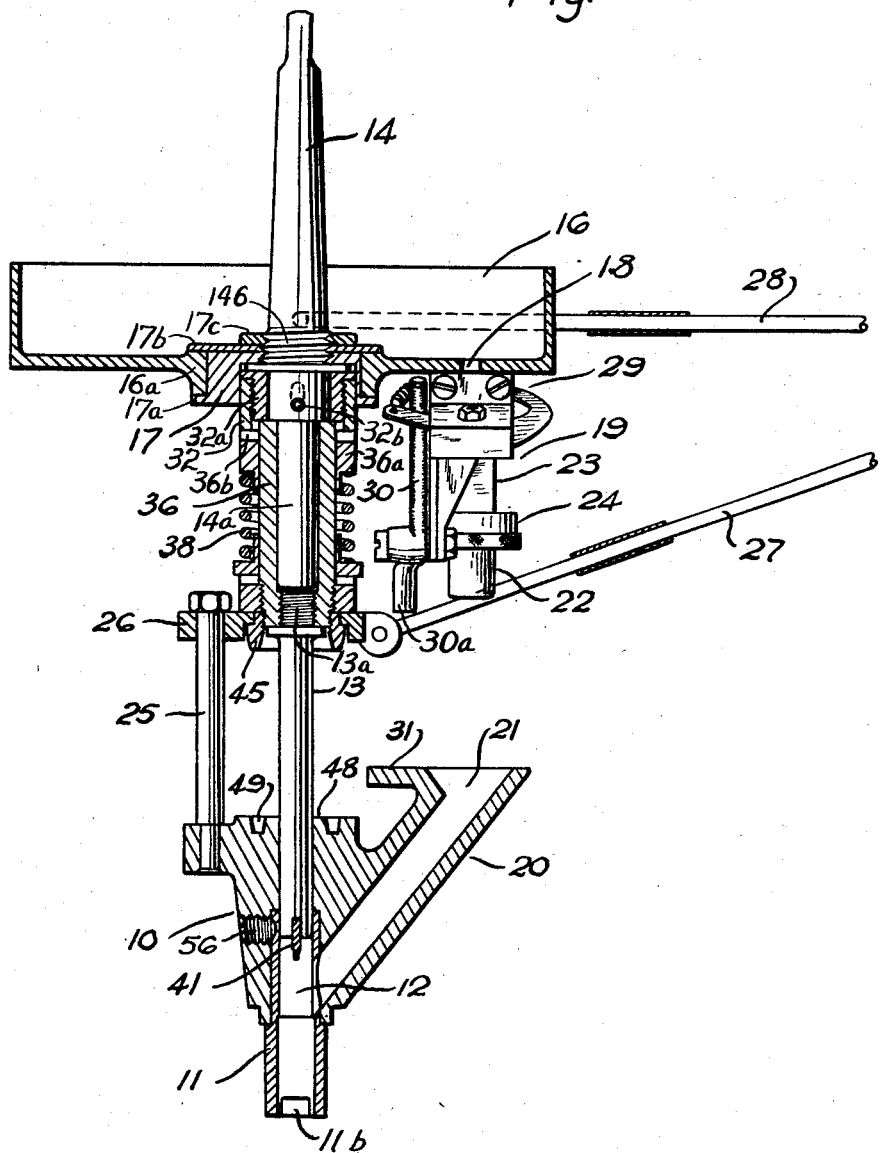

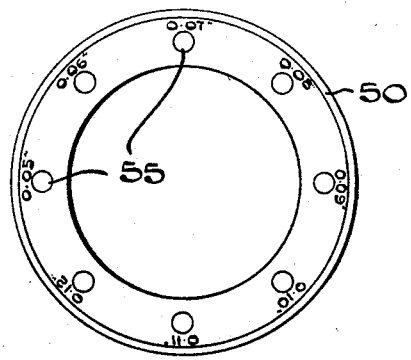
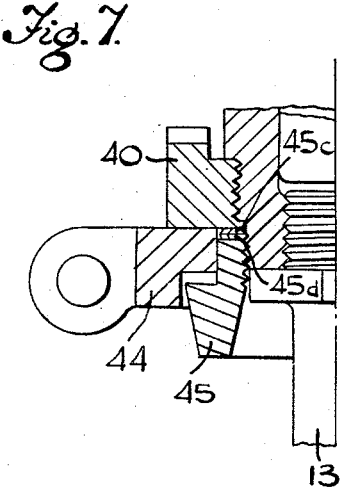
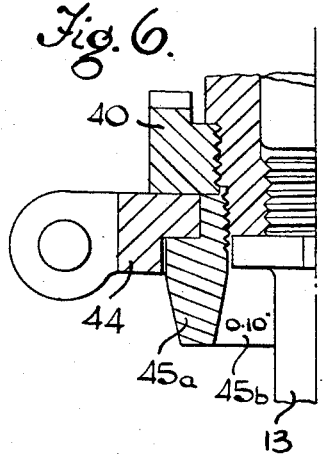

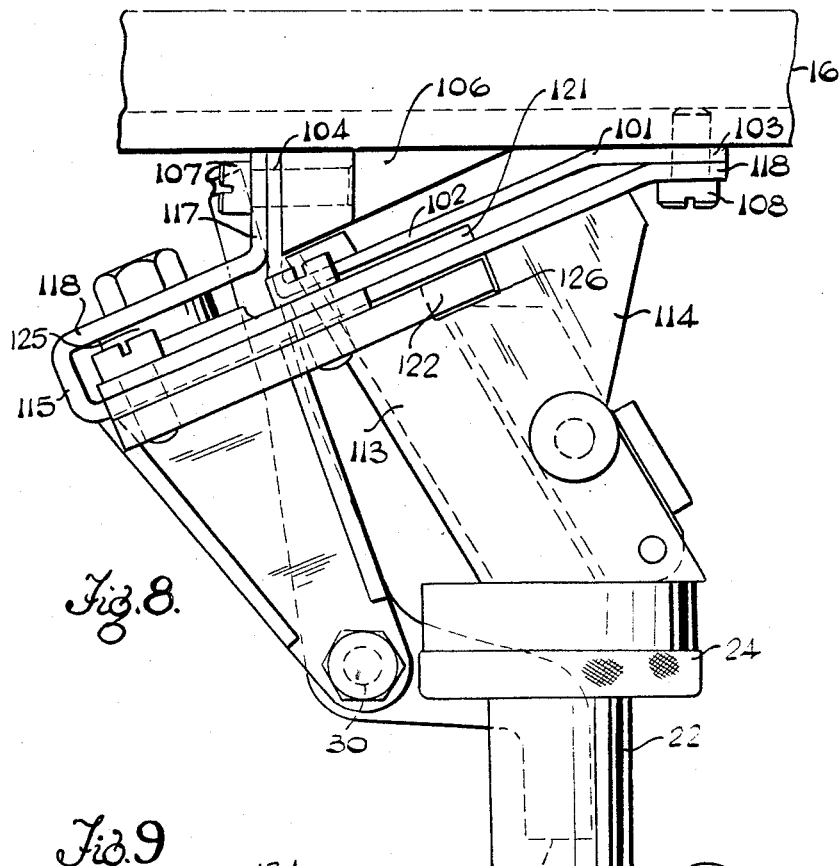
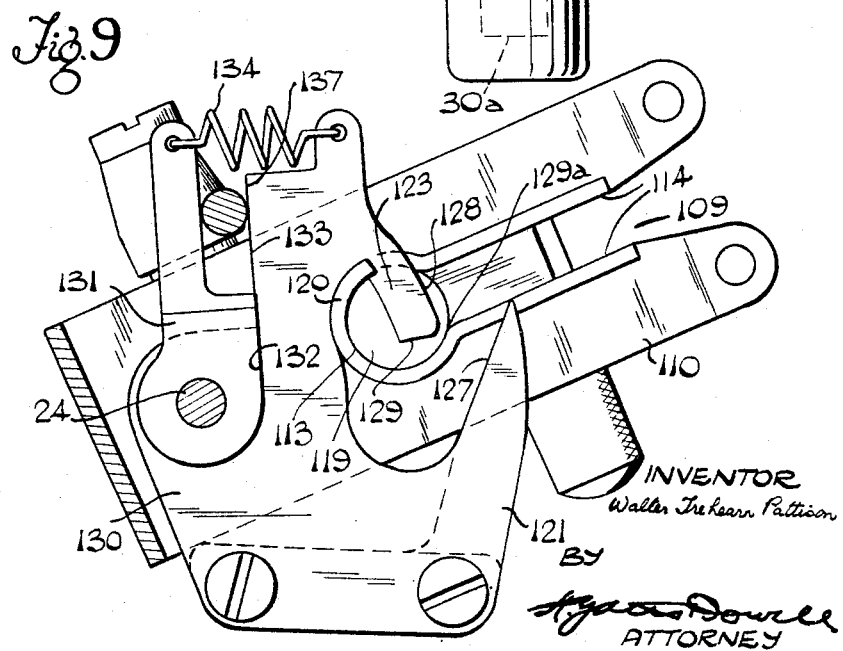

April 12, 1960 W. T. PATTISON 2,932,332
SCREW-DRIVING MACHINES
Filed Oct. 21, 1957 6 Sheets-Sheet 6
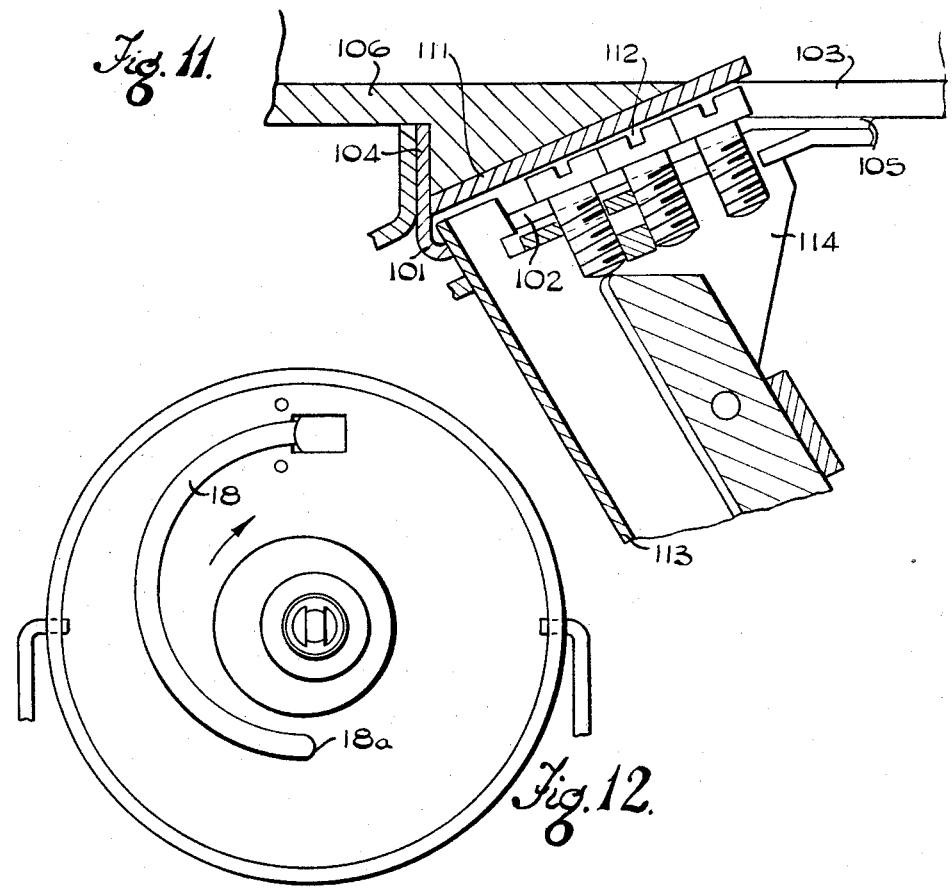
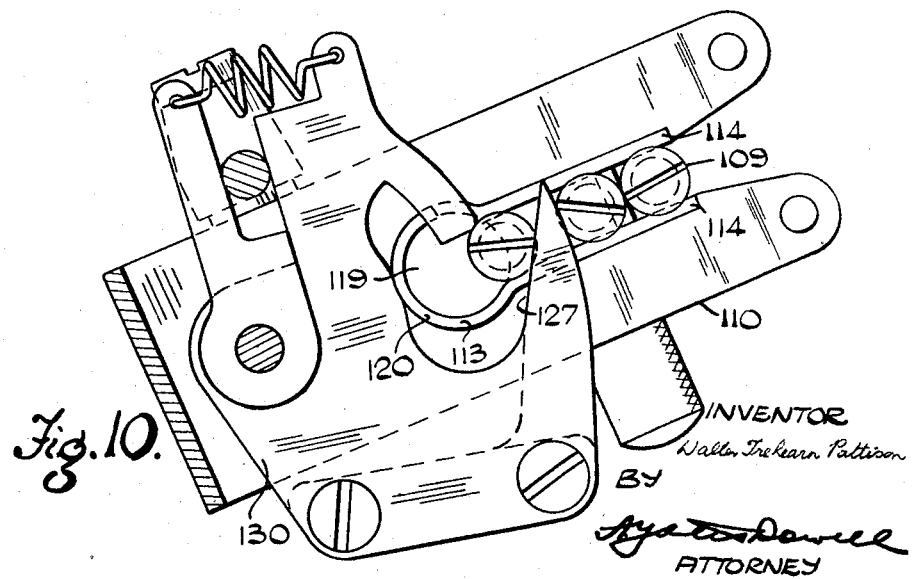
INVENTOR
Walter Trekearn Pattison
BY
ATTORNEY

United States Patent Office 2,932,332
Patented Apr. 12, 1960

2,932,332

SCREW-DRIVING MACHINES

Walter Trehearn Pattison, Redditch, England, assignor to The Russell Auto-Feed Screwdrivers Limited, Birmingham, England, a British company Application October 21, 1957, Serial No. 691,353

8 Claims. (Cl. 144—32)

This invention relates to screw-driving machines of the kind comprising a hopper for containing a plurality of screws to be driven, a screw delivery nozzle, a rotary screw-driving spindle assembled co-axially therewith and movable axially therewith to engage with and drive screws delivered to such nozzle, guide means leading from the hopper to the nozzle and a delivery control device associated with the guide means for regulating the delivery of screws to the nozzle.

The invention is specifically concerned with screw-driving machines (hereinafter referred to as being of the kind specified) of the foregoing kind wherein the screw-driving spindle is driven from an input spindle through a torque limiting clutch or device.

In a known form of screw-driving machine the input spindle has been arranged co-axially with the screw-driving spindle, dog clutch collars being mounted respectively on these two spindles, one of which collars is slidable to a limted axial extent on this spindle under the control of a slot in the collar and a pin on this spindle which enters the slot, a helically coiled spring on the spindle normally urging this movable collar into engagement with the other collar, the arrangement being such that when the screw-driving spindle encounters resistance to turning above a predetermined value the slotted collar turns on its spindle producing axial disengagement of the two collars against the spring, the stressing of which can be adjusted to provide for such disengagement at any predetermined value of resistance torque desired.

Dis-engagement of this torque limiting clutch device has hitherto occurred in known screw-driving machines of the kind specified when the head of the screw engages the work.

In some classes of work, however, particularly in assemblies for electrical apparatus where wires, tags or other connectors are required ultimately to be clamped between the underface of a screw head and a member into which the screw is threaded, it is desired initially that the screw should be left in a position such that the underface of this head is spaced from the opposed surface of the member into which it screws.

Furthermore, in some classes of work it may not be desirable to rely upon the resistance encountered to further screwing home of a screw to bring the clutch or other torque limiting device of the screw-driving machine into operation as for example where tearing away of the material into which the screw is driven may occur if the threads of the hole formed therein either before or by reason of entry of the screw are prone to damage in this manner.

The main object of the present invention is to provide a screw-driving machine wherein the extent or force to which a screw is driven home can be determined independently of the resistance encountered in effecting the driving of such screw.

A further object of the invention is to enable screws to be driven home to an extent such that the underfaces of the screw heads are still spaced from the member into which the shanks are driven to permit of the subsequent insertion beneath said heads of any part or component ultimately to be clamped beneath such screw head.

Yet another object of the invention is to enable the magnitude of such spacing to be varied as required in particular classes of work.

Broadly according to the invention a screw-driving machine of the kind specified is provided with a brake device comprising a first brake element operatively connected with the screw-driving spindle to rotate therewith, a second brake element, initially spaced from the first brake element, means restraining the second brake element against rotation when engaged by the first brake element, and means for bringing said brake elements into engagement with each other in response to said axial movement of the screw-driving spindle relatively to the nozzle, whereby said torque-limiting clutch means is caused to slip or disengage when the screw-driving spindle is in a predetermined axial position relatively to the discharge end of the nozzle.

The invention will now be described by way of example with reference to the accompanying drawings, wherein:

Figure 1 is a perspective view of one construction of screw-driving machine of the kind specified in accordance with the invention.

Figure 2 is a view in side elevation and in diametral cross section of the same construction.

Figure 3 is a further view in side elevation and diametral cross section showing on an enlarged scale a fragment of the machine, particularly the nozzle assembly and stationary and rotating brake elements.

Figure 4 is a further fragmentary view in diametral cross section illustrating a modified construction providing for adjustment of the initial axial spacing of the brake elements.

Figure 5 is an underneath plan view of the upper part of the rotary brake element shown in the construction illustrated in Figure 4.

Figure 6 is a fragmentary view similar to Figure 4 illustrating the substituting of a one-piece rotary brake element of a height differing from the rotary brake element shown in Figure 3.

Figure 7 is a view similar to Figure 4 showing the use of a rotary brake element of a height equal to that shown in Figure 3, but with washers interposed between this brake element and the clutch component next above it to vary the depth to which screws are driven into a work piece.

Figure 8 is a view in side elevation and on an enlarged scale of the delivery control device associated with the hopper and the upper part of the guide means assembled therewith.

Figure 9 is a fragmentary plan view of the delivery control device removed from the under-side of the hopper, the escapement member being shown in its initial position.

Figure 10 is a view similar to Figure 9 showing the escapement member in a position intermediate its initial position and its fully displaced position illustrating also the transference of a screw from the parallel sided portion of the guide slot to the enlarged portion above the guide means.

Figure 11 is a fragmentary view similar to Figure 8 but in cross-section in a vertical plane through the center line of the guide slot, the escapement member accompanying the position shown in Figure 10, and Figure 12 is a plan view of the machine showing the spiral slot in the base of the hopper.

Referring firstly to Figures 1 and 2 the machine comprises a nozzle assembly 10 including a nozzle member 11 affording a downwardly extending bore 12 for the passage of screws therethrough point first, and a screw-driving spindle 13 assembled co-axially with the nozzle 11 such spindle being rotatable in and movable axially of the nozzle.

The screw-driving spindle is operatively connected with an input spindle 14 through a torque-limiting clutch 15.

A hopper 16 conveniently in the form of a circular peripherally flanged tray encircles the input spindle 14. A certain number of the screws placed in a loose mass in the hopper will take up a position in the slot 18, their shanks extending downwardly through this slot and their heads resting on the margins of the hopper base bordering on the edges of the slot. An eccentric circular motion is imparted to the hopper 16 which is retained against rotation about its own axis by means of the arms 27 and 28, and this causes a circular sifting motion to be imparted to the screws in a direction indicated by the arrow (Figure 12). The eccentric circular motion is produced by a bushing 17 keyed to the input spindle 14 and mounted in the bore of a boss 16a formed integrally in the base of the hopper. The boss 16a rests on a radially extending flange 17a at the lower end of the eccentric bushing 17 and is retained against upward displacement by a washer plate 17b and internally threaded ring 17c screwing on to the portion 14b of the spindle 14.

The spindle 14 will normally be rotated clockwise (when driving screws having right-hand threads) and consequently the eccentric motion imparted to the hopper 16 by the eccentric bushing 17 is also clockwise.

The spindle 14 is normally rotated at about 600 r.p.m. or thereabouts and at this speed the inertia of the mass of screws in the hopper is such that they tend to slip relatively to the base thereof to some extent, so that relatively to the base of the hopper the screws undergo the circular sifting motion previously mentioned. During part of each eccentric revolution of the hopper this relative motion will tend to advance the screws along the slot 18 in the direction of the arrow. At this time the screws tend to be moved away from the trailing or blind end 18a of the slot 18 towards the other end at which the delivery control device is situated, there being an outlet to the slot at this last mentioned end so that the screws do in fact progress along the slot in this direction. Further screws will enter the slot adjacent to the blind end 18a under the influence of gravity to fill the vacant space left at this end of the slot in consequence of advancement of the screws. During a further part of the eccentric motion of the hopper when the screws in the slot would tend to be moved backwardly towards the blind end, the latter and the additional screws which have filled the vacant spaces positively prevent reversed movement of the screws along the slot, so that it will be apparent that the overall motion of the screws is one of advancement in the direction of the arrow.

The machine further includes guide means of which the upper part is indicated generally at 19 and the lower part at 20 for conveying the screws from the outlet in the hopper to the nozzle 11.

The lower part of the guide means comprises a delivery tube 21 branching in an upwardly inclined manner with respect to the nozzle from a position spaced vertically at its lower or discharge end. The upper part 19 of the guide means comprises a deflection tube 22 adapted to enter the mouth of the delivery tube 21 upon descent of the screw-driving spindle 13 in the nozzle but free to deflect angularly in conformity with the gyratory motion of the hopper 16, for this purpose the deflection tube 22 being connected to an upper guide member or wing tube 23 through a joint means 24 adapted to permit of the requisite angular deflection of the tube 22.

The nozzle assembly 10 is restrained against rotation by a guide post 25 engaging slidably through a guide plate 26 itself provided with a radially projecting torque anchor arm 27 adapted to engage with the post or pillar of a drilling machine in conjunction with which the screw-driving machine is intended to be used.

The hopper 16 is also provided with an arm or bracket 28 engaging with the arm 27 preventing rotation of the hopper.

In association with the slot 18 of the hopper is provided a delivery control device indicated generally at 29 adapted to regulate the supply of screws through the guide means to the nozzle 11, this delivery control device being operated by a driving lever 30 the lower end of which is adapted to engage an upwardly presented stop or platform 31 at the upper end of the guide means 20 each time the screw-driving spindle 13 is caused to descend in the nozzle.

The delivery control device is illustrated in greater detail in Figures 8, 9, 10, and 11. At the end of the slot 18 towards which the screws are advanced there is secured beneath the base of the hopper a chute plate 101, the main portion of which inclines downwardly with respect to the base 103 of the hopper, the ends of this chute plate including two attachment portions 104 and 105 which are vertical and horizontal respectively, and which are secured to a downward projection 106 at the underside of the hopper base and to the hopper base respectively by screws 107 and 108.

The chute plate 101 is formed with a guide slot, the shape of which conforms to a similar slot 109 (Figure 10) provided in an associated flange plate 110 hereinafter referred to, this guide slot being the continuation of the slot 18 in the base of the hopper, and screws such as those indicated in Figures 10 and 11 can thus pass in single file down the guide slot with their heads supported by the margins of the main portion 102 of the chute plate, and their shanks depending in a downwardly inclining manner as seen in Figure 11.

In combination with the chute plate 101 is provided a top wall member in the form of a plate 111 thus defining a guide passageway 112 for the heads of the screws. The height of this guide passageway 112, that is to say the head room or spacing between the main portion of the chute plate 101 and the plate 111, is such as to allow the screws to move freely down the passageway 112 whilst preventing them from turning angularly in a vertical plane passing through the axes of the shanks of the screws.

The feed control device further comprises an escapement device which operates in combination with the structure defining the passageway 112, but it will be convenient to refer firstly to the upper part of the guide means 19 disposed immediately beneath the chute plate 101 for receiving screws upon discharge from the outlet of the chute plate.

The upper part of this guide means comprises a tube including a tubular portion 113 (Figures 8 and 11) and a pair of spaced parallel plates 114, these parts at their outer ends being fixed in any suitable manner, for example by welding or soldering to the flange plate 110 previously referred to.

The flange plate is bent upwardly, as indicated at 115, and then parallel again to its main portion, as indicated at 116, and finally upwardly again at 117, this last mentioned portion being formed with a screw hole to enable it to be secured to the projection 106 by the screw 107 which also retains the chute plate in position. At its opposite end the flange plate 110 includes a horizontal portion 118 having screw holes for the passage of screws 108, the guide slot 109 in the chute flange plate and the companion guide slot in the chute plate, each incorporates an enlargement of generally circular form communicating with the parallel sided portion of the slot as indicated generally in the case of the flange plate at 119. In the flange plate this enlargement accommodates an extension 120 of the tubular portion 113, this extension being a semi-cylindrical shell. The remaining portion of the circumference of the enlargement 119 is of a diameter equal to the internal diameter of the tubular portion 113 so that effectively the enlargement 119 is of the same diameter as the internal diameter of the tubular portion 113.

In association with the two plates 101 and 110 is an escapement member 130 having upper and lower escapement finger elements 121 and 122 and an arresting finger 123, this escapement member being pivotally mounted for oscillation on a bolt 124 extending through the upper portion 118 of the flange plate, a suitable washer or distance piece 125 being disposed between the portion 118 of the flange plate and the underlying portion thereof.

The upper escapement finger element 121 is disposed and operates above the flange plate 110 and beneath the main inclined portion 102 of the chute plate 101, whilst the lower escapement finger element 122 is disposed and operates below the flange plate 110 through apertures such as that seen at 126 in the plates 114.

The screws of which the heads are disposed in the passageway 112 are engaged at two axially spaced positions on their shanks by the cam faces constituted by the trailing edges of the escapement finger elements such as that indicated at 127.

The shanks of the screws are also engaged at the same level as that of the upper escapement finger element by the arresting finger 123 firstly by its leading edge 128 and subsequently by a bevelled edge portion 129a, and finally by the end edge 129.

The resultant three-point engagement of the shank of each screw by the escapement finger elements, and by the arresting finger, as seen particularly in Figure 11, is effective to guard against the possibility of angular deflection of the screw in a vertical plane whilst this is being moved down the guide slot 109 and during transfer into the enlargement 119 thereof under the action of the escapement member 130.

For effecting oscillatory movement of the escapement member 130 a driving lever 30 is provided.

The driving lever 30 is caused to rotate in a clockwise direction as seen in Figure 8 when its lower end 30a is brought into contact with the upwardly presented stop or platform 31. This occurs whenever the machine as a whole is lowered by downward feed movement of the spindle of the drill press, in which the spindle 14 is carried, this being effected by the operator for the purpose of applying a screw temporarily held by the abutments 11b of the nozzle 11 to the work into which it is to be driven. The nozzle 11 engages the work and is thus restrained against further downward displacement, but the screwdriving spindle 13 moves down the bore of the nozzle by virtue of the continued downward bodily displacement of the assembly comprising the driving spindle 14, the hopper 16, and the delivery control device 29. It is this operation which brings the end 30a of the driving lever 30 into contact with the stop or platform portion 31, whereby the driving lever imparts the requisite movement to the escapement member to cause a screw to be moved into the enlargement 119 and then discharged down the guide means 113, 22, and 20 so as to reach a position alongside the screw driving spindle 13 which will, at this time, be blocking the lower end of the guide means 20. It will be evident, therefore, that upon raising of the drill press spindle and retraction of the screw-driving spindle to the position illustrated in Figure 2, this screw can descend gravitationally into the nozzle 11 to be retained by the abutments 11b ready for the next screwdriving operation.

The purpose of the relief lever 131 is to prevent damage to the escapement member and to the parts of the delivery control device 29 through application to the escapement member of the relatively strong deflecting force which will be exerted thereon by the driving lever 30 in the event of angular movement of the escapement member being obstructed in moving from its initial position (as seen in Figure 9), towards an operated position (as seen in Fgiure 10), for example if the leading ends of the escapement finger elements should happen to engage the shank of a screw exactly at the end of a diameter through the shank of the screw or if the screw should for any cause have become jammed in the passage 112 (Figure 11).

The relief lever 131 is pivotally mounted on the bolt 124 and is normally held with an abutment face 132 situated by its edge in contact with the edge 133 of the escapement member by means of a tension spring 134. If, however, the escapement member encounters positive obstruction in moving from its initial position, as seen in Figure 9 towards an operative position which the escapement finger elements extend cross-wise of the guide slot 109, then the relief lever 131 can turn on the bolt 124, the edges 132 and 133 separating from each other and the spring 134 being temporarily extended.

Referring now more particularly to the upper part of the guide means, indicated in Figure 2 by the general reference 19, this upper part comprises the tubular portion 113 previously referred to constituting an upper guide member, and comprises also a lower guide member in the form of the deflection tube 22.

The deflection tube 22 is connected with the tubular portion 113 through a joint means 24 permitting of universal angular displacement between the tubular portion 113 and the deflection tube 22. Structurally, this joint means may be in the form more fully described and illustrated in my co-pending application No. 691,296.

Certain characteristic features of the upper part of the guide means 19 and the delivery control device 29 are more fully described and illustrated in my copending application Ser. No. 691,296 filed on the same date as the present application and entitled "Improvements Relating to Screw-Driving Machines" to which reference can be had for a fuller description.

The present invention is particularly concerned with the provision of means for bringing the torque-limiting clutch 15 into operation when screws have been driven into a workpiece to the requisite extent.

The torque-limiting clutch 15 is of known construction per se, but it is indicated for convenience that such clutch comprises a driving clutch member in the form of a collar 32 screwed on to a bushing 32a fast with the input spindle 14 by means of a pin 32b.

The driving member of the clutch comprises a collar 36a which on its upwardly axially presented face is formed with dog-teeth 36b which co-operate with downwardly axially presented dog-teeth 37 on the collar 32. The collar 36a incorporates inclined slots 34 through which extend screws 35 engaging in threaded holes in the sleeve 36 within which an extension 14a of the spindle 14 is freely rotatable.

The screw driving spindle 13, screws by means of a spigot 13a into an internally threaded end portion of the sleeve 36 so as to be fast therewith. Torque is transmitted from the driving member 32 of the clutch to the driven member 36a through the co-operative dog-teeth 37 and 36b and thence through a helically coiled spring 38 which is anchored at its upper end to the driven member 36a, and at its lower end to a collar 39 which is rotatable on the sleeve 36 and which incorporates downwardly presented ratchet teeth co-operating with upwardly presented ratchet teeth on a further collar 40, which is fast on the sleeve 36.

The helical spring 30 may be wound up or tightened by setting the collars 39 and 40 in any predetermined position of rotation relatively to each other (unwinding being restrained by the co-operative ratchet teeth) and the stressing of the spring 38 tends to retain the collar 36a in position such that the screws 35 are disposed in the lower ends of the inclined slots 34, as seen in Figure 1. If, however, the torque transmitted through the clutch exceeds that applied to pre-stress the spring 38 the latter tends to unwind so that relative rotation takes place between the collar 36a and the screws 35, and, due to the inclination of the latter, the collar 36a is then displaced downwardly to disengage the co-operative dog-teeth 37 and 36b.

The setting of the collar 39 relatively to the collar 40 thus determines the limiting torque which can be transmitted through the clutch.

Referring now particularly to Figure 3 the screw-driving spindle 13 which at its lower end is provided with a removable and replaceable screw-driving bit 41 is at its upper end fast with the driven member 36 of the torque-limiting clutch member, this latter member being screw-threaded internally at its lower end to receive a screw-threaded spigot 42 at the upper end of the spindle 13 below which is an integral collar 43 abutting the lower end face of the sleeve 36.

At its lower end the sleeve 36 is of reduced diameter and screw-threaded externally to receive the collar 40 already referred to and is still further reduced but still threaded externally to receive the internally threaded spigot 44 of a rotary brake element 45 which screws on to the sleeve 36.

In combination the members 40 and 45 define a circumferential groove enabling the assembly to be journalled for rotation in a circular aperture in the guide plate 26.

The guide post 25 is a close sliding fit through the guide plate 26 and at its lower end is secured to the nozzle assembly by means of a spigot 46 which is at tight fit in a hole or socket in the body of the nozzle assembly, descent of the nozzle assembly when the machine is out of use being prevented by means of a retaining nut 47 on the screw-threaded upper end of the guide post 25.

It will be understood that in use the input spindle 14 is received in the chuck or equivalent member on the drilling machine having a work-table connected by a vertical post or pillar to the head of the machine in which the chuck is journalled for rotation about a vertical axis. When the head of the drilling machine is moved downwardly in the normal manner the whole screw-driving machine is lowered until the lower or discharge end of the nozzle 11 engages the upper face of the workpiece, and thereafter continued descent of the spindle 14 produces relative axial movement of the screw-driving spindle 13 in the nozzle until the bit 41 engages with the screw positioned in the nozzle ready for driving into the workpiece.

The nozzle assembly 10 incorporates outwardly displaceable inwardly urged jaws 11a including inwardly projecting abutments 11b at their lower ends for engaging beneath the head of a delivered screw to prevent this becoming discharged prematurely from the lower or discharge end of the nozzle 11 before engagement by the screw-driving bit 41.

The nozzle assembly 10 incorporates in its upwardly presented face 48 a groove 49, the portion of the nozzle assembly incorporating such groove constituting a stationary brake element.

The groove may be of truncated V-section and the cross sectional shape of the rotary brake element 45 may be of similar cross sectional shape but slightly larger dimensions so that braking action occurs through engagement of the side walls of the groove 49 by the side faces of the rotary brake element 45.

The element 45 is adapted to be brought into engagement with the side walls of the groove in response to downward axial displacement of the screw-driving spindle 13 and for a given length of such spindle will be brought into engagement when the lower end of the spindle and in particular the bit 41 is at a predetermined height above the lower or discharge end of the nozzle 11.

Thus the initial axial spacing of the rotary and stationary brake elements determines the position occupied by the spindle 13 when brake engagement and clutch dis-engagement takes place.

Adjustment of the initial axial spacing between the brake elements may be effected by employment of the construction illustrated in Figure 4 in which parts corresponding to those illustrated in Figure 3 are designated by like numerals of reference.

In this case the rotary brake element is made in two parts 50 and 51, the latter being adjustable axially with respect to the former by the provision of complementary screw-thread formations 52 and 53. For retaining the parts 50 and 51 in any of a plurality of positions of adjustment a set screw 54 may be provided in the part 51 which set screw can engage in any of a plurality of angularly spaced holes 55 in the part 50.

If desired the part 50 may be marked with a scale in relation to the holes 55, as seen more particularly in Figure 5 wherein markings are made against each hole corresponding to the height at which the under-faces of the screw will be spaced from the opposed face of the work-piece upon the brake element coming into operation to terminate the screw driving operation. The set screw will then act as a pointer.

Alternatively, as illustrated in Figure 6 wherein parts corresponding to those of Figure 3 have been designated by like numerals of reference, the rotary brake element 45 is replaced by a rotary brake element 45a of generally similar form, but of greater height so that it is brought into co-operative engagement with the groove 49 when the spindle 13 is at a relatively higher position in the nozzle 11. Brake elements such as 45a may be marked as indicated at 45b to indicate the space left between the underfaces of the screws and the opposed face of the work-piece when the screw driving operation ceases through operation of the brake means.

In yet another alternative illustrated in Figure 7 wherein parts corresponding to those of Figure 3 are designated by numerals of reference, the rotary brake element 45 is of the same form and dimensions as that illustrated in Figure 3, but is lowered relatively to the screw driving spindle 13 by the interposition of one or more washers such as those indicated at 45c and 45b so that again the space between the under-faces of the screw and the opposed face of the work-piece on termination of the screw driving operation can be varied as required.

What I claim then is:

1. In a screw driving machine of the kind comprising a hopper for containing a plurality of screws to be driven, a screw delivery nozzle, a rotary screw-driving spindle assembled co-axially therewith and movable axially therein to engage with and drive screws delivered to such nozzle, guide means for the screws leading from the hopper to the nozzle, and torque limiting clutch means connecting the screw-driving spindle with a rotary driving member, the provision of a brake device comprising a first brake element operatively connected with the screw-driving spindle to rotate therewith, a second brake element, initially spaced from the first brake element, means restraining the second brake element against rotation when engaged by the first brake element, and means for bringing said brake elements into engagement with each other in response to said axial movement of the screw-driving spindle relatively to the nozzle, whereby said torque-limiting clutch means is caused to slip or disengage when the screw-driving spindle is in a predetermined axial position relatively to the discharge end of the nozzle.

2. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, guide means for the screws leading from the hopper to the nozzle, and torque-limiting clutch means connecting the screw-driving spindle with a rotary driving member, the provision of a brake device comprising a stationary brake element mounted on a non-rotatable part of the machine a rotary brake element operatively connected with the screw-driving spindle to rotate therewith, and initially spaced axially of the screw-driving spindle from the stationary brake element and means for bringing said brake elements into engagement with each other in response to said axial movement of the screw-driving spindle relatively to the nozzle, whereby said torque-limiting clutch means is caused to slip or disengage when the screw-driving spindle is in a predetermined axial position relatively to the discharge end of the nozzle.

3. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, guide means for the screws leading from the hopper to the nozzle, and torque-limiting clutch means connecting the screw-driving spindle with a rotary driving member, the provision of a brake device comprising a stationary brake element on part of an assembly which includes the nozzle, means for restraining said assembly against rotation, a rotary brake element mounted on part of a rotary assembly including the screw-driving spindle, the rotary brake element being initially spaced axially of the screw-driving spindle from the stationary brake element and being movable axially with the screw-driving spindle to engage the stationary brake element whereby said torque-limiting clutch means is caused to slip or disengage when the screw-driving spindle is in a predetermined axial position relatively to the discharge end of the nozzle.

4. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, guide means for the screws leading from the hopper to the nozzle, and torque-limiting clutch means connecting the screw-driving spindle with a rotary driving member, the provision of an assembly including the nozzle and having a bore extending through it leading to the nozzle for the passage of the screw-driving spindle, an axially presented face on said assembly at its end remote from the nozzle, a stationary brake element on said face and surrounding said bore, an assembly including the screw-driving spindle and a driven element of the torque-limiting clutch means, a rotary brake element fixed on the last said assembly and surrounding the spindle and initially spaced axially from the stationary brake element when the screw-driving spindle is in its initial position relatively to the discharge end of the nozzle, but adapted to engage with the stationary brake element in response to axial movement of the screw-driving spindle relatively to the first said assembly, whereby said torque-limiting clutch means is caused to slip or disengage when the screw-driving spindle is in a predetermined axial position relatively to the discharge end of the nozzle.

5. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, guide means for the screws leading from the hopper to the nozzle, and torque-limiting clutch means connecting the screw-driving spindle with a rotary driving member, the provision of an assembly including the nozzle and having a bore extending through it leading to the nozzle for the passage of the screw-driving spindle, an axially presented face on said assembly at its end remote from the nozzle, said face incorporating a groove constituting a stationary brake element on said face and surrounding said bore, an assembly including the screw-driving spindle and a driven element of the torque-limiting clutch means, a rotary brake element of annular form shaped to engage frictionally in said groove and fixed on the last said assembly and surrounding the spindle, the rotary brake element being initially spaced axially from the stationary brake element when the screw-driving spindle is in its initial position relatively to the discharge end of the nozzle, but adapted to engage with the stationary brake element in response to axial movement of the screw-driving spindle relatively to the first said assembly.

6. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, guide means for the screws leading from the hopper to the nozzle, and torque-limiting clutch means connecting the screw-driving spindle with a rotary driving member, the provision of a brake device comprising a stationary brake element on part of an assembly which includes the nozzle, means for restraining said assembly against rotation, a rotary brake element mounted on part of a rotary assembly including the screw-driving spindle, the rotary brake element being initially spaced axially of the screw-driving spindle from the stationary brake element, means for adjusting said initial spacing, and means for bringing said brake elements into engagement with each other in response to said axial movement of the screw-driving spindle relatively to the nozzle, whereby said torque-limiting clutch means is caused to slip or disengage when the screw-driving spindle is in a predetermined axial position relatively to the discharge end of the nozzle dependent upon the setting of the means for adjusting said initial spacing.

7. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, guide means for the screws leading from the hopper to the nozzle, and torque-limiting clutch means connecting the screw-driving spindle with a rotary driving member, the provision of a brake device comprising a stationary brake element on part of an assembly which includes the nozzle, means for restraining said assembly against rotation, a rotary brake element mounted on part of a rotary assembly including the screw-driving spindle, the rotary brake element being initially spaced axially of the screw-driving spindle from the stationary brake element, means for adjusting said initial spacing, comprising a part determining said spacing and removably mounted in the machine so as to be replaceable by a differently dimensioned part providing a different spacing, and means for bringing said brake elements into engagement with each other in response to said axial movement of the screw-driving spindle relatively to the nozzle, whereby said torque-limiting clutch means is caused to slip or disengage when the screw-driving spindle is in a predetermined axial position relatively to the discharge end of the nozzle, dependent upon the dimensions of said removable and replaceable part.

8. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, guide means for the screws leading from the hopper to the nozzle, and torque-limiting clutch means connecting the screw-driving spindle with a rotary driving member, the provision of a brake device comprising a stationary brake element on part of an assembly which includes the nozzle, means for restraining said assembly against rotation, a rotary brake element mounted on part of a rotary assembly including the screw-driving spindle, the rotary brake element being initially spaced axially of the screw-driving spindle from the stationary brake element, means for adjusting said initial spacing, scale and pointer means adapted to indicate the setting of said adjustment means, and means for bringing said brake elements into engagement with each other in response to said axial movement of the screw-driving spindle relatively to the nozzle, whereby said torque-limiting clutch means is caused to slip or disengage when the screw-driving spindle is in a predetermined axial position relatively to the discharge end of the nozzle, dependent upon the setting of the means for adjusting said initial spacing.

References Cited in the file of this patent

UNITED STATES PATENTS

| | | |
|---|---|---|
| 2,605,792 | Havener | Aug. 5, 1952 |
| 2,632,485 | Peck | Mar. 24, 1953 |
| 2,796,161 | Graybill | June 18, 1957 |
| 2,835,365 | Rice et al. | May 20, 1958 |